(12) United States Patent
Knight

(10) Patent No.: US 6,499,288 B1
(45) Date of Patent: Dec. 31, 2002

(54) PRESSURIZER FOR A ROCKET ENGINE

(76) Inventor: Andrew F. Knight, 800 4$^{th}$ St. SW. Apt. S-610, Washington, DC (US) 20024

( * ) Notice: Subject to any disclaimer, the term of this patent is extended or adjusted under 35 U.S.C. 154(b) by 10 days.

(21) Appl. No.: 09/878,293

(22) Filed: Jun. 12, 2001

(51) Int. Cl.$^7$ .................................................. F02K 9/46
(52) U.S. Cl. ........................ 60/211; 60/259; 60/39.45; 417/64; 417/392
(58) Field of Search ..................... 60/259, 211, 39.45; 417/64, 392

(56) References Cited

U.S. PATENT DOCUMENTS

| | | | | |
|---|---|---|---|---|
| 2,505,798 A | * | 5/1950 | Skinner | |
| 2,701,441 A | * | 2/1955 | Mitchell | |
| 3,209,986 A | * | 10/1965 | Kentfield | 417/64 |
| 3,213,804 A | * | 10/1965 | Sobey | |
| 3,945,203 A | * | 3/1976 | Kayser | |
| 4,880,185 A | * | 11/1989 | Apfel | |
| 5,205,722 A | * | 4/1993 | Hammond | |
| 5,471,833 A | * | 12/1995 | Pahl | |
| 5,839,463 A | | 11/1998 | Blackmon et al. | |
| 6,213,348 B1 | | 4/2001 | Le Grouyellec | |
| 6,314,978 B1 | | 11/2001 | Lanning et al. | |

* cited by examiner

Primary Examiner—Ehud Gartenberg

(57) ABSTRACT

The present invention provides for a pressurizer for pressurizing a fluid, comprising a pressurant entrance for the introduction of a pressurant, a fluid entrance for the fluid, a fluid exit for the fluid, and a transfer chamber movable in a cycle with respect to the fluid exit, where for a portion of a cycle the pressurant exerts a force on the fluid inside the transfer chamber. In a preferred aspect of the present invention, the pressurizer further comprises a spindle housing more than one transfer chamber, rotatable about an axis between the fluid entrance and the fluid exit. In another preferred aspect, the transfer chamber comprises either a flexible membrane or a movable piston to separate the pressurant and the fluid.

29 Claims, 19 Drawing Sheets

PRESSURIZER FOR A ROCKET ENGINE

BACKGROUND

Rocket engines require propellants to be fed to them at very high pressures. This has historically been accomplished in two general ways: first, with the use of a pressurized fluid, such as high pressure helium; and second, with the use of a pump.

In the first way, a pressurized fluid is added directly to the propellant tank and exerts a force on the propellant. Nitrogen and helium, both inert gases, pressurized to a pressure as high as 50,000 PSI, have been used successfully in the past. As they are inert, there need be no barrier (e.g. membrane or piston) placed between these pressurized fluids and the propellant. The problem with this method, however, is that the pressurized fluid also exerts a force on the propellant tank. Because of the extremely high pressures required of the pressurized fluid, the walls of the propellant tank must be thick enough to withstand the pressure. The propellant tank is therefore very heavy. Rockets employing the pressurized fluid must use a greater proportion of their thrust lifting this extra weight, and therefore they are not as efficient as rockets that do not require this added weight.

Historically, one way to solve the above weight problem is to employ the use of a pump. Pumps (e.g. reciprocating or centrifugal pumps) are generally very complex and require their own driving means, such as an engine. Further, the engine driving the pump burns a significant percentage of the total propellant. For small rocket engine systems, since a pump is too complicated and too heavy, pressurized fluids are generally used to pressurize the propellant. However, for large rocket engine systems, pumps have the advantage that the walls of the propellant tank need not be thick, since there is little or no pressure in the tank. Therefore, the propellant tank is much lighter, and the added weight of the pump is more than offset by the reduction in propellant tank weight.

U.S. Pat. No. 3,213,804 to Sobey discloses fluid pressure accumulators that are connected to sources of low and high pressure by means of butterfly valves. Essentially, the pressurized fluid exerts force on the propellant in small, designated containers. While the walls of these containers must be thick in order to withstand the high pressure of the pressurized fluid, the walls of the propellant tank need not be. Therefore, the total weight of the rocket engine system employing Sobey's invention may be less than that of the previously discussed rocket engine system because these containers (fluid pressure accumulators) are small in comparison to the propellant tank.

A problem with Sobey's invention, however, is its complicated use of valves. In order to reduce the weight of Sobey's invention further, the sizes of the fluid pressure accumulators must decrease (thus reducing their weight). However, as they decrease, the rotation speed and precision of the butterfly valves must increase in order to accommodate the same propellant flow rate to the rocket engine. This places great stresses on the valves, and eventually a point is reached at which the valves cannot reliably rotate fast enough to provide the required timing.

SUMMARY OF THE INVENTION

The present invention provides for a pressurizer for pressurizing a fluid, comprising a pressurant entrance for the introduction of a pressurant, a fluid entrance for the fluid, a fluid exit for the fluid, and a transfer chamber movable in a cycle with respect to the fluid exit, where for a portion of a cycle the pressurant exerts a force on the fluid inside the transfer chamber. In a preferred aspect of the present invention, the pressurizer further comprises a spindle housing more than one transfer chamber, rotatable about an axis between the fluid entrance and the fluid exit. In another preferred aspect, the transfer chamber comprises either a flexible membrane or a movable piston to separate the pressurant and the fluid. In another preferred aspect, the pressurizer further comprises a pressurant exit for a pressurant exhaust. In another preferred aspect, the pressurant exhaust is exhausted in a direction substantially opposite a direction of motion of the transfer chamber. In another preferred aspect, the pressurizer further comprises a motor to move said transfer chamber. In another preferred aspect, a cross section of the pressurant entrance is larger than a cross section of the fluid exit, and a cross section of the pressurant exit is larger than a cross section of the fluid entrance. In another preferred aspect, a cross section of the fluid entrance is greater than a cross section of the fluid exit.

The present invention also provides for a rocket engine system, comprising a pressurant, a pressurant container, a propellant, a propellant container, a rocket engine, and a transfer chamber movable in a cycle with respect to the rocket engine, where for a portion of a cycle the pressurant exerts a force on the propellant inside the transfer chamber. In a preferred aspect, for a portion of a cycle a bouyant force causes the propellant to flow into, and the pressurant to flow out of, the transfer chamber. In another preferred aspect, the rocket engine system further comprises a heating means for heating the pressurant, where the heating means comprises a heat conductor for conducting heat from the rocket engine to the pressurant. In another preferred aspect, a pressurant exhaust exerts a force on the propellant inside the propellant container. In another preferred aspect, the propellant comprises an oxidizer and a fuel. In another preferred aspect, the rocket engine system further comprises an engine conduit between the transfer chamber and the engine and a propellant conduit between the transfer chamber and the propellant container, where a cross section of the propellant conduit is greater than a cross section of the engine conduit.

DETAILED DESCRIPTION

In the following description, the use of "a," "an," or "the" can refer to the plural. All examples given are for clarification only, and are not intended to limit the scope of the invention.

Figure 1:
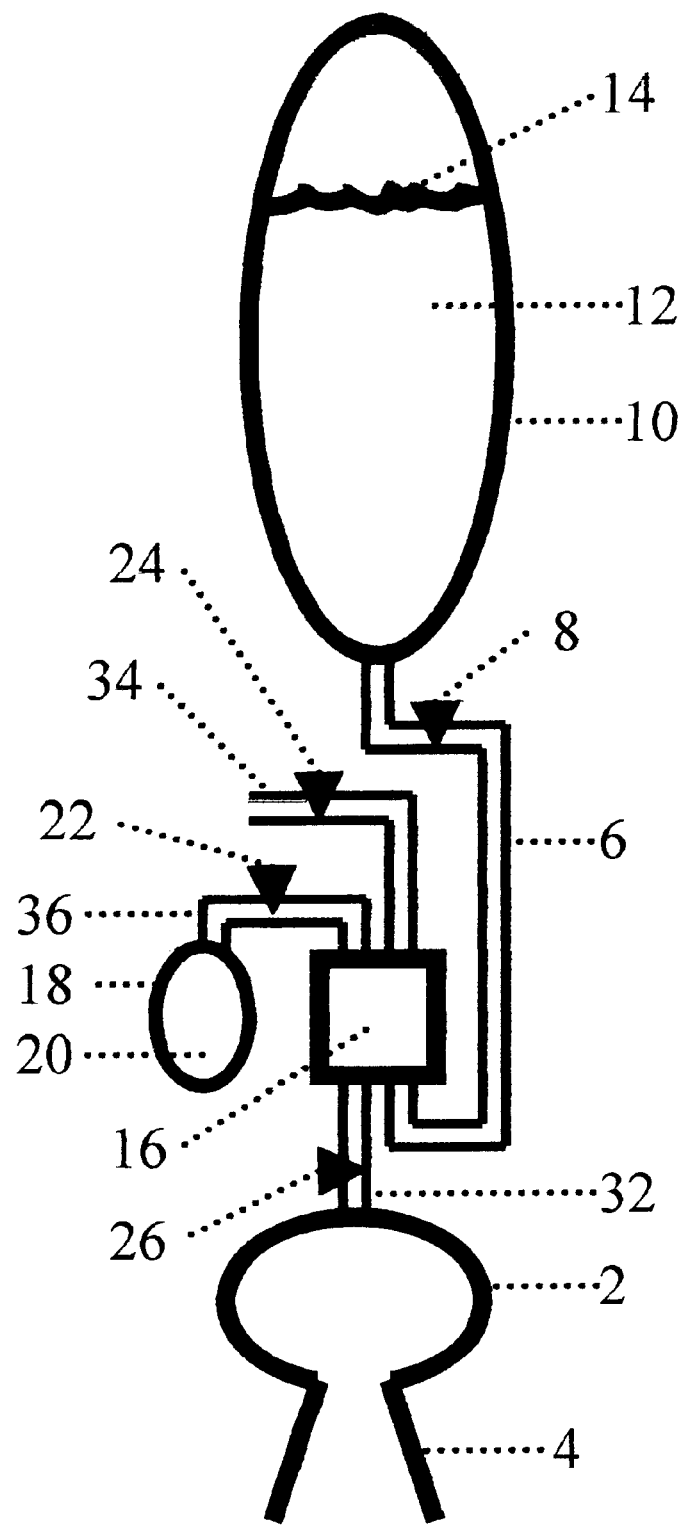
FIG. 1 shows a schematic view of a rocket engine system employing the pressurizer described herein.

Referring to FIG. 1, according to a preferred embodiment, a rocket engine system includes a propellant tank 10 connected by a propellant conduit 6 to a pressurizer 16, a pressurant tank 18 connected by a pressurant conduit 36 to the pressurizer 16, and a rocket engine 2 with a nozzle 4 connected by an engine conduit 32 to the pressurizer 16. The propellant tank 10 contains a propellant 12 with meniscus 14. Flow of the propellant 12 into pressurizer 16 is controlled by propellant valve 8. A pressurant tank 18 contains a pressurant 20. Flow of the pressurant 20 into pressurizer 16 is controlled by pressurant valve 22. Flow of propellant 12 from pressurizer 16 to engine 2 is controlled by engine valve 26. Pressurant exhaust is released from exhaust conduit 34, and its flow is controlled by exhaust valve 24.

Propellant 12 combusts in engine 2 and the resulting gas accelerates through nozzle 4. Propellant 12 can be any monopropellant, such as a substance that decomposes by itself or in the presence of a catalyst. One example is hydrogen peroxide. Propellant 12 can also be a fuel or an oxidizer in a hybrid rocket engine system. For example, propellant 12 could be liquid oxygen and engine 2 could contain a solid resin fuel. Further, propellant 12 need not be a reacting substance at all—it could be a working medium that is heated by an external heat source. For example, propellant 12 could be liquid hydrogen and engine 2 could contain a nuclear reactor that heats the hydrogen to high pressures.

Pressurant 20 can be any high-pressure fluid, and the following description is meant as an example and not as a limitation. Pressurant 20, if it comes into direct contact with the propellant 12, should be nonreactive with propellant 12. (An embodiment will be described later in which the pressurant 20 does not come into contact with propellant 12.) Further, it should not react with the walls of the pressurant tank 18 or any of the components of the pressurizer herein described. For example, two fluids that meet this description are inert gases such as helium and nitrogen. However, both of these fluids are gases at room temperature (regardless of their pressure); therefore, a high density may be difficult to obtain. A high density for pressurant 20 is necessary so that a large quantity of pressurant 20 can be held in a small pressurant tank 18. Because pressurant tank 18 is designed to withstand very high pressures, its walls may be very thick, resulting in a large weight. Therefore, the smaller the pressurant tank 18, the better. In a preferred embodiment of the present invention, the pressurant 20 is a liquid with a very high vapor pressure. For example, liquid carbon dioxide at room temperature has a vapor pressure of approximately 750 PSI. However, 750 PSI, while high, may not be high enough. As another example, liquid nitrogen can be heated until its vapor pressure is, for example, 2000 PSI. Because of the very high vapor pressure attainable, and because liquid nitrogen is much denser than gaseous nitrogen, liquid nitrogen may be a good choice for pressurant 20. One skilled in the art will realize that a plethora of other good choices exist for pressurant 20.

Figure 19:
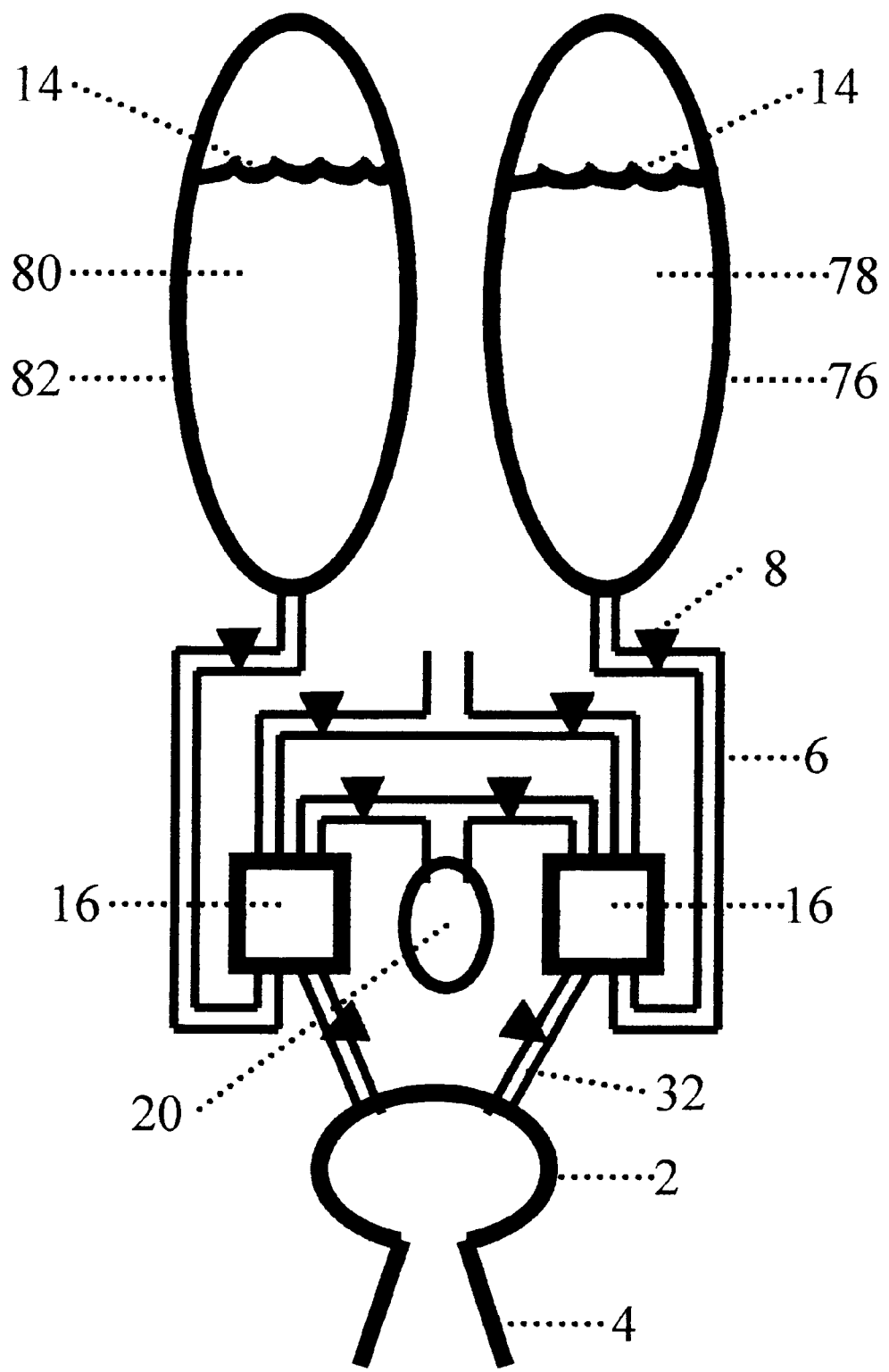
FIG. 19 is a schematic view of a rocket engine system employing two propellants.

Referring to FIG. 19, in another preferred embodiment of the present invention, the rocket engine system comprises two propellants, a fuel 78 contained in a fuel tank 76 and an oxidizer 80 contained in an oxidizer tank 82. Each of the fuel and the oxidizer has its own pressurizer 16, and the pressurizers 16 may or may not share a common pressurant 20. In other embodiments, the rocket engine system could comprise more than two propellants, or two propellants other than a fuel and oxidizer. For example, it could comprise a fuel, an oxidizer, and a catalyst, or a decomposing propellant and a catalyst.

Many different potential combinations of propellant tanks and pressurizers would be apparent to one skilled in the art.

Figure 2:
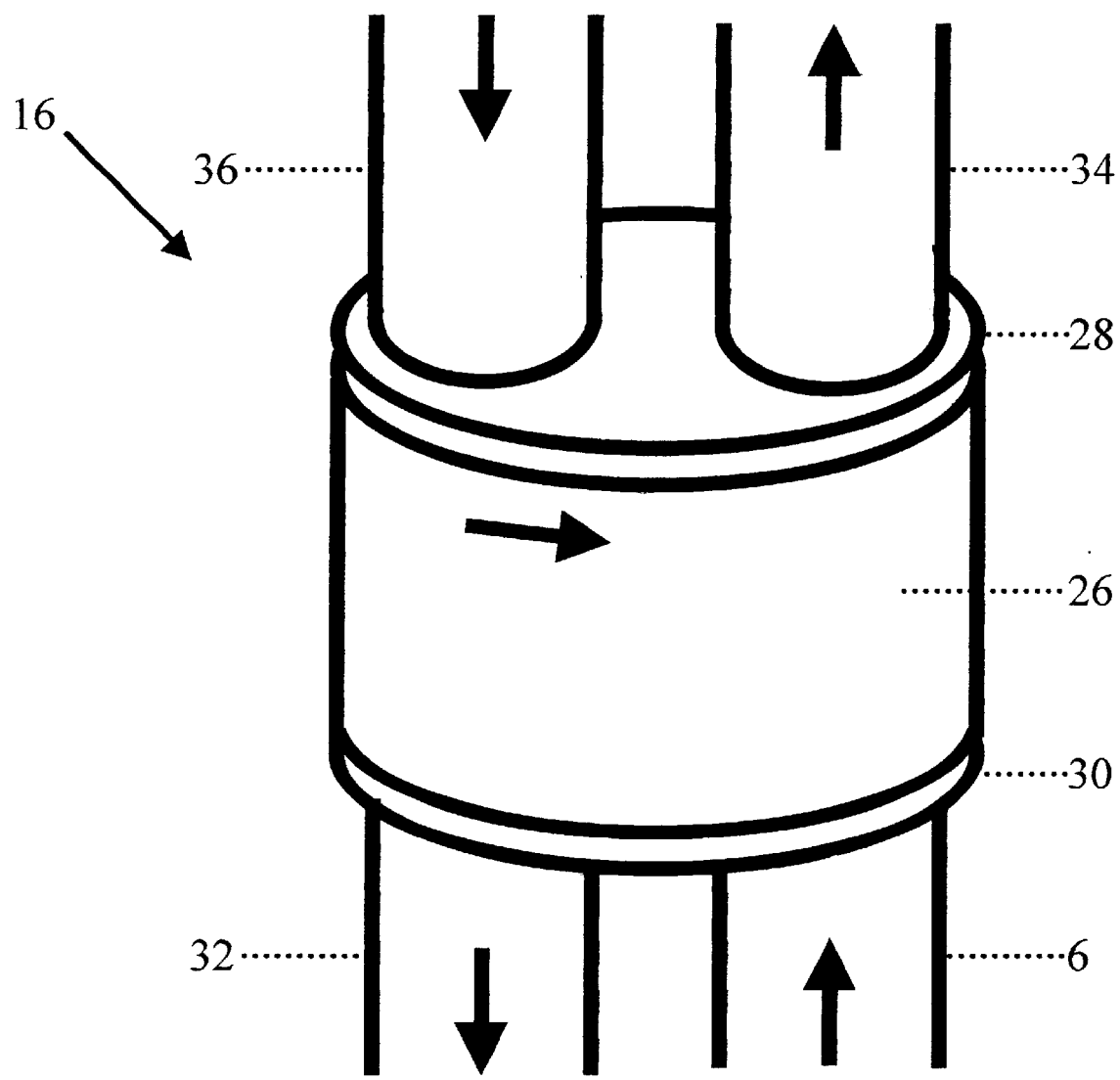
FIG. 2 shows a perspective view of a preferred embodiment of the pressurizer described herein.

Referring now to FIG. 2, a pressurizer according to a preferred embodiment includes: (a) a top chamber separator 28 to which pressurant conduit 36 and exhaust conduit 34 are connected; (b) a bottom chamber separator 30 to which engine conduit 32 and propellant conduit 6 are connected; and (c) a rotatable spindle 26. Propellant 12 flows into the spindle 26 through propellant conduit 6 and out of the spindle 26 through engine conduit 34. Pressurant 20 flows into the spindle 26 through pressurant conduit 36 and out of the spindle through exhaust conduit 34. Propellant 12 and pressurant 20 flow in the direction indicated by the arrow shown in each conduit. The spindle 26 in this embodiment rotates in the direction indicated by the arrow shown on the spindle 26, although it would be obvious that it could spin in the opposite direction.

Figure 3:
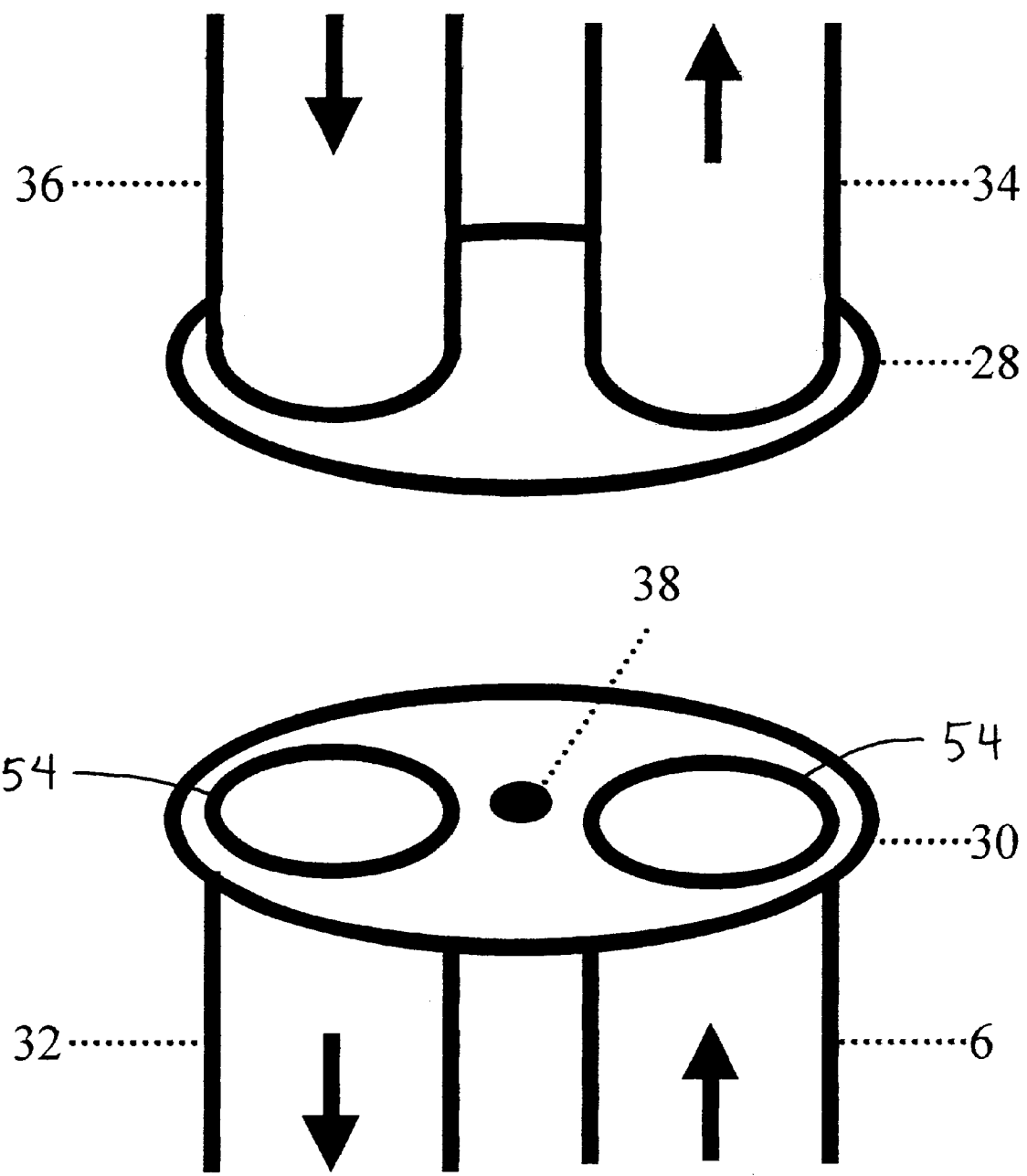
FIG. 3 shows a perspective view of the pressurizer in FIG. 2 without the spindle.

Referring to FIG. 3, which shows the pressurizer without the spindle 26, the pressurizer includes a rotatable connector 38 that rotatably connects the bottom chamber separator 30 to the spindle 26. There could also be such a connector connecting the top chamber separator 28 to the spindle 26. The connector could comprise bearings, such as ball bearings or gas bearings. Further, there are seals (not shown) between the moving spindle 26 and selected parts of the top chamber separator 28 and the bottom chamber separator 30. The seals should allow the spindle 26 to spin with minimal friction while preventing propellant 12 and pressurant 20 from flowing into the wrong conduits at the wrong times. By way of example and not of limitation, there could be a circular seal around the circular hole 54 on the left side of the bottom chamber separator 30 in FIG. 3, where the engine conduit 32 connects to the bottom chamber separator 30. There could also be a seal on the top of the bottom chamber separator 30 and around its circumference, with an additional seal to separate the left and right halves of the bottom chamber separator. The placement and material composition of such seals would be obvious to one skilled in the art.

Figure 4:
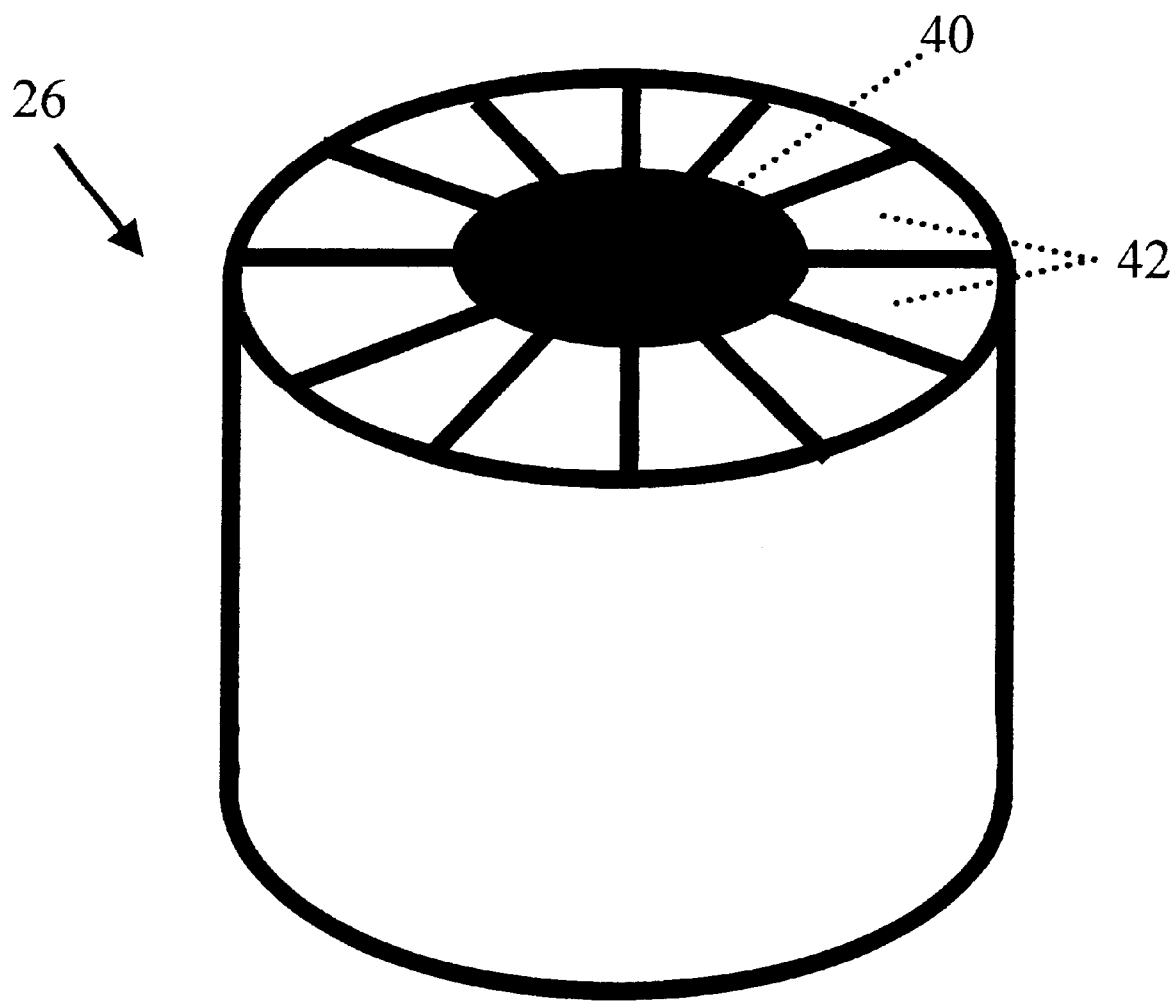
FIG. 4 shows a perspective view of the spindle.
Figure 5:
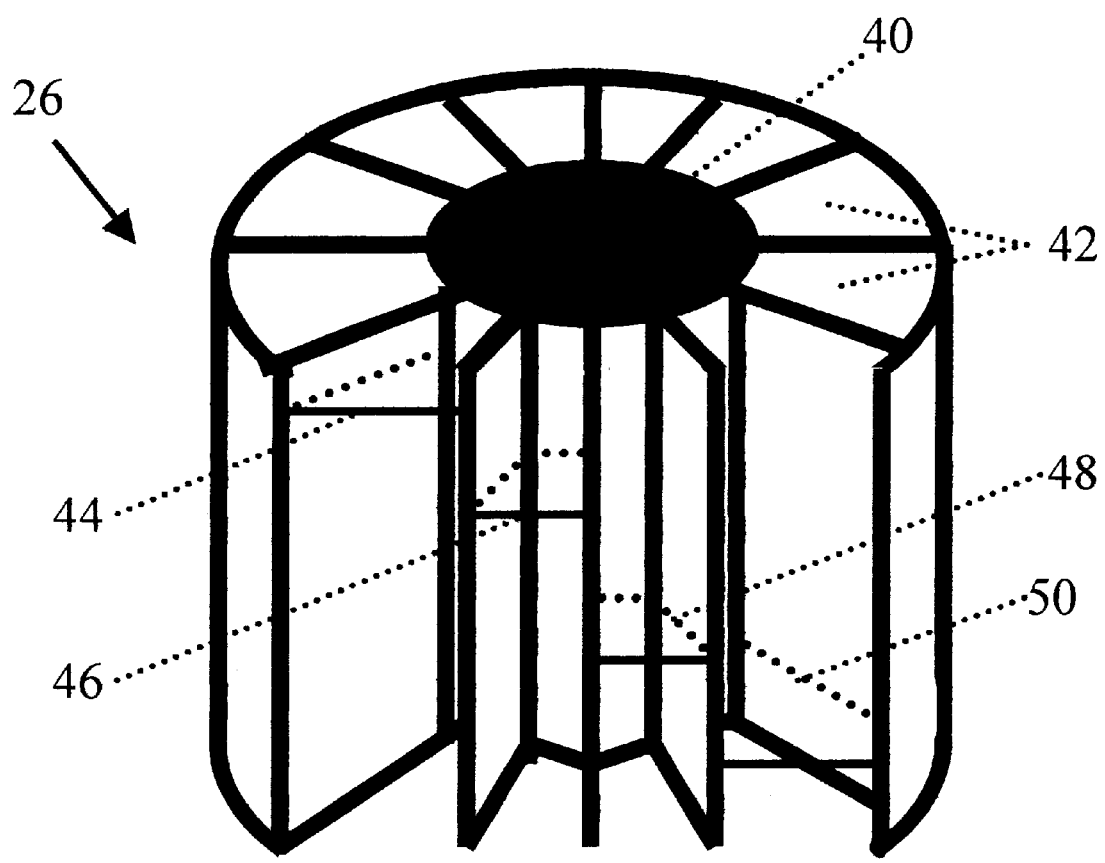
FIG. 5 shows a cut-away view of FIG. 4.

Referring to FIG. 4, spindle 26 includes a plurality of transfer chambers 42 and a center 40. Each complete rotation of the spindle 26 is a complete cycle for each transfer chamber 42. For each transfer chamber 42, for a portion of each cycle, propellant 12 flows inward from propellant conduit 6 (in the direction of the arrow indicated as shown in FIGS. 2 and 3) and pressurant 20 flows outward to exhaust conduit 34; for another portion of the cycle, propellant 12 flows outward to engine conduit 32 and pressurant 20 flows inward from pressurant conduit 36. Now referring to FIG. 5, each transfer chamber 42 is an individual chamber divided from the next, so that the meniscus of propellant 12 in each transfer chamber 42 is potentially different. First meniscus 44 is the meniscus in a transfer chamber that is just beginning the portion of the cycle in which propellant 12 flows outward to engine conduit 32 and pressurant 20 flows inward from pressurant conduit 36. Fourth meniscus 50 is the meniscus in a transfer chamber that is just ending the portion of the cycle in which propellant 12 flows outward to engine conduit 32 and pressurant 20 flows inward from pressurant conduit 36. In this figure, propellant 12 is flowing downward under the force of pressurant 20.

Figure 6:
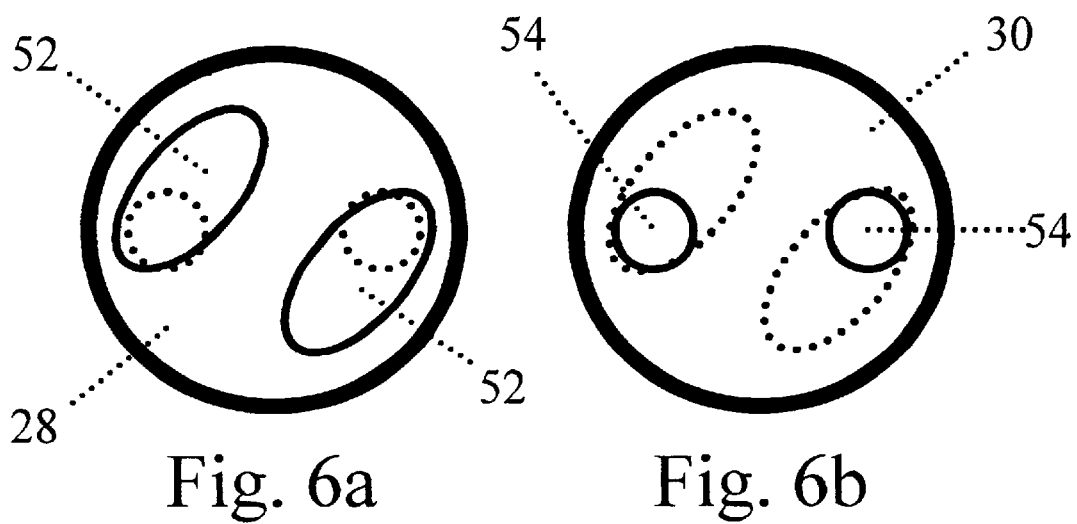
FIG. 6a shows a top view of the top chamber separator.
FIG. 6b shows a bottom view of the bottom chamber separator.

Referring now to FIGS. 6a and 6b, the oblong holes 52 in top chamber separator 28 of the pressurant conduit 36 and the exhaust conduit 34 are larger than the corresponding circular holes 54 in bottom chamber separator 30 of the engine conduit 32 and the propellant conduit 6. Further, oblong holes 52 "cover" as well as "precede" the circular holes 54 in the direction of rotation of the spindle 26, as shown in the figures. The oblong holes 52 must "cover" the circular holes 54 so that the pressurant 20 is acting on the propellant 12 in a given transfer chamber 42 at all times that the propellant 12 in the transfer chamber 42 is in pressure communication with the engine 2 via engine conduit 32. Further, the oblong holes 52 must "precede" the circular holes 54 so that the pressurant 20 has sufficient time to pressurize the transfer chamber and provide the proper force on the propellant 12 before the propellant 12 is placed in pressure communication with the engine 2 via engine conduit 32. There are other ways to achieve the same result and would be obvious to one skilled in the art. For example, oblong holes 52 could be thinner than shown in the figures and still achieve the same result. Further, they need not be oblong, nor need the circular holes 54 be circular.

As the spindle 26 (not shown in FIGS. 6a and 6b) rotates once in the counterclockwise direction relative to a top side view of the top chamber separator 28, each transfer chamber 42 (not shown) completes a cycle. For illustrative purposes, suppose a transfer chamber is currently full with propellant 12. As it moves inside spindle 26, it first comes upon an oblong hole 52 of the pressurant conduit 36. Pressurant 20 then rapidly flows into the transfer chamber 42, due to its high pressure, and soon reaches an equilibrium pressure. Next, the transfer chamber 42 comes upon circular hole 54 of the engine conduit 32. Propellant 12 is now in pressure communication with the engine 2, and propellant flows to the engine 2 via engine conduit 32 under the force of pressurant 20 until most or all of propellant 12 has flowed from the transfer chamber 42. Next, the transfer chamber 42 moves past the circular hole 54, thus ending the pressure communication of propellant 12 with engine 2. Next, the transfer chamber moves past the oblong hole 52 and pressurant 20 is no longer able to flow into transfer chamber 42. The transfer chamber 42 may move past both the circular hole 54 and the oblong hole 52 roughly simultaneously.

Next, the transfer chamber 42 comes upon an oblong hole 52 of the exhaust conduit 34. The pressurant 20 flows out of the transfer chamber into the exhaust conduit 34 until a near equilibrium pressure is reached between the inside of the transfer chamber 42 and the exhaust pressure of the exhaust conduit 34. The exhaust pressure may be atmospheric pressure, or it may be a vacuum if the pressurizer herein described is used in space. Next, the transfer chamber 42 comes upon a circular hole 54 of the propellant conduit 6. The propellant 12, the pressure of which at its entrance into the transfer chamber 42 is higher than the exhaust pressure of the exhaust conduit 34, flows into the transfer chamber 42 as it displaces the remaining pressurant 20, until the propellant 12 completely or mostly fills the transfer chamber 42. Next, the transfer chamber 42 moves past the circular hole 54, thus ending the flow of propellant 12 into transfer chamber 42. Next, the transfer chamber moves past the oblong hole 52 and pressurant 20 is no longer in pressure communication with exhaust conduit 34. The transfer chamber 42 may move past both the circular hole 54 and the oblong hole 52 roughly simultaneously.

One full cycle has been described. After this, the cycle begins again. Because of the plurality of transfer chambers 42 in the spindle 26, the pressurizer 16 is designed so that at any given time at least one transfer chamber 42 is in pressure communication with both the engine 2 via engine conduit 32 and the pressurant 20 via pressurant conduit 36 simultaneously, thus ensuring continuous, uninterrupted flow of propellant 12 to the engine 2.

The propellant 12 at its entrance into the transfer chamber 42 is at a higher pressure than the exhaust pressure of the exhaust conduit 34 because of a pressure head due to the height of meniscus 14 relative to the entrance of the propellant 12 into the transfer chamber 42. However, this pressure may or may not be sufficient. In order to increase this pressure, and thereby increase the flow rate of propellant 12 into transfer chamber 42, the propellant tank 10 may be pressurized. The propellant tank 10 need not be pressurized to a very high pressure, and should be lower than the pressure of the pressurant 20. (If the propellant 12 were pressurized to a pressure at or above the pressure of the pressurant 20, there would be no need for the pressurizer 16, and the walls of the propellant tank 10 would have to be very thick and heavy.) By way of example and not of limitation, the propellant tank 10 could be pressurized to between 10 and 200 PSI, or even more, if the pressurant pressure is exceedingly high.

Generally, the difference between the pressure of the pressurant 20 and the working (combusting) pressure of the engine 2 is significantly greater than the difference between the pressure of the propellant 12 at its entrance into the transfer chamber 42 and the exhaust pressure of the exhaust conduit 34. The flow rate of a fluid (e.g. propellant 12) through a conduit (e.g. propellant conduit 6) generally depends on several factors, including the difference in pressure at each end of the conduit, as well as the minimum cross sectional area of the conduit. Therefore, the flow rate per cross sectional area is generally proportional to the difference in pressure at each end of the conduit A flow rate between the propellant tank 10 and the transfer chamber 42 should be equal to a flow rate between the transfer chamber 42 and the engine 2. Otherwise, at the end of each cycle, each transfer chamber 42 would have significantly more or less propellant 12 than it did at the end of the previous cycle. If this trend continued, it would eventually result in one of two undesirable consequences: either propellant 12 would be lost directly through the exhaust conduit 34, or else pressurant 20 would be fed directly into the engine conduit 32. In order to set the flow rate between the propellant tank 10 and the transfer chamber 42 equal to the flow rate between the transfer chamber 42 and the engine 2, the minimum cross sectional area of the path between the propellant tank 10 and the transfer chamber 42 (e.g. propellant conduit 6) should be greater than the minimum cross sectional area of the path between the transfer chamber 42 and the engine 2 (e.g. engine conduit 32). This is necessary to counteract the effect resulting from a difference in pressure between the pressurant 20 and the engine 2 that is higher than the difference in pressure between the propellant 12 at its entrance into the transfer chamber 42 and the exhaust pressure of the exhaust conduit 34.

Therefore, one of the circular holes 54 (FIG. 6b) could be larger than the other, the larger one corresponding to the point of connection between the engine conduit 32 and the bottom chamber separator 30. Further, the engine conduit 32 could have a smaller cross section than the propellant conduit 6. It would be obvious to one skilled in the art how to adjust the dimensions of the various elements of the pressurizer described herein in order to assure proper flow rates of propellant 12 into and out of transfer chamber 42.

Figure 7:
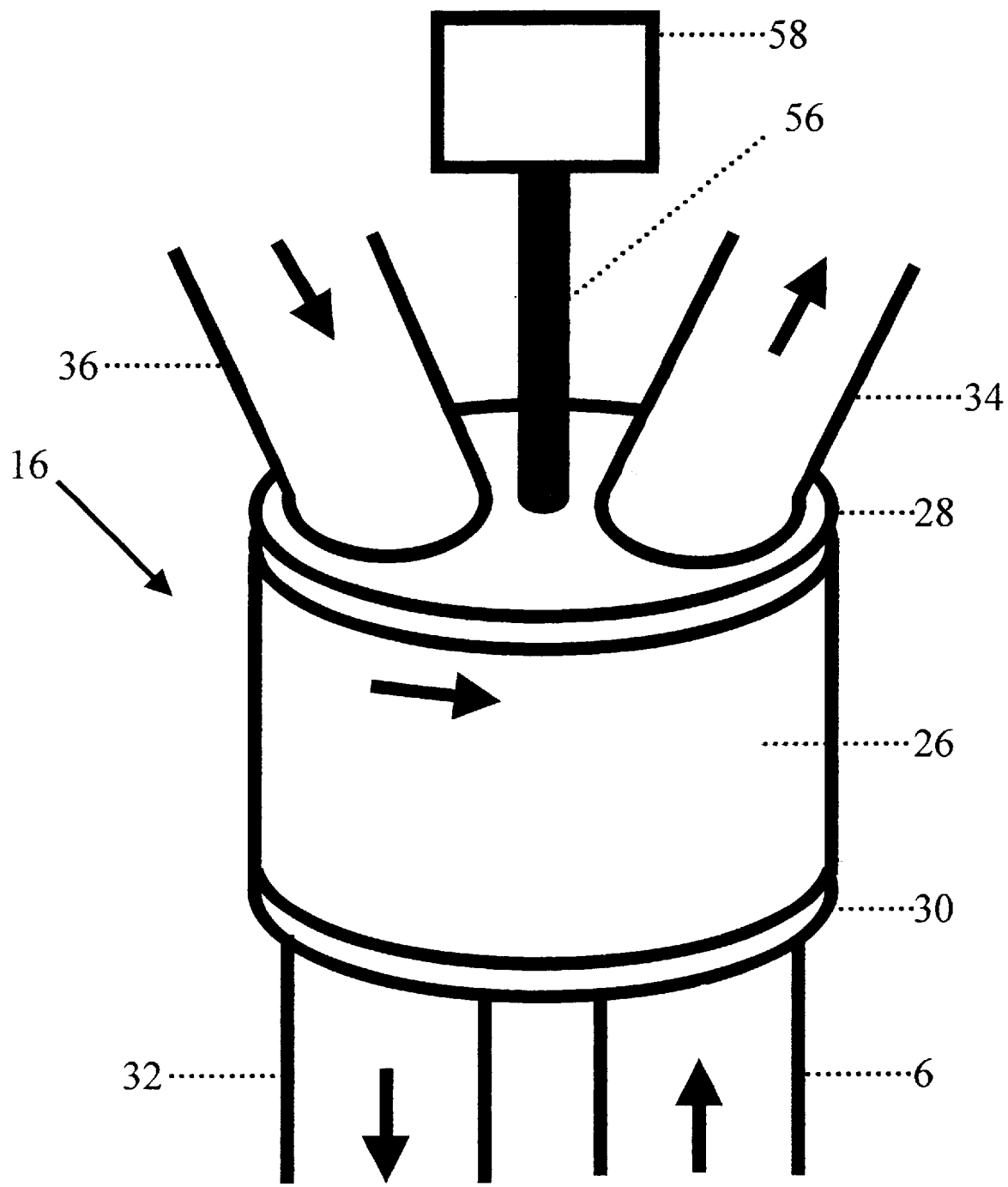
FIG. 7 shows a perspective view of the pressurizer in FIG. 2 with a motor.

Referring now to FIG. 7, the spindle 26, housing a plurality of transfer chambers 42, can be rotated by an external means of rotation, such as a motor 58 connected to the spindle 26 via motor shaft 56. As the motor 58 spins, the spindle 26 rotates. In each rotation of the spindle 26, each transfer chamber 42 inside is subject to a fill cycle as previously described The motor 58 could be an electric motor, powered by a battery or some other electric power supply. The motor 58 could also be a piston engine or a turbine, powered, for example, by the combustion/decomposition of propellant 12 or the expansion of the pressurant 20. However, the motor 58 does not need to be large or to consume much energy. It needs only to overcome the friction resulting from the contact between the moving spindle 26 and the stationary chamber separators 28, 30 via the seal. The greater the friction and the faster the spinning of the spindle 26, the more work the motor 58 needs to do.

Figure 8:
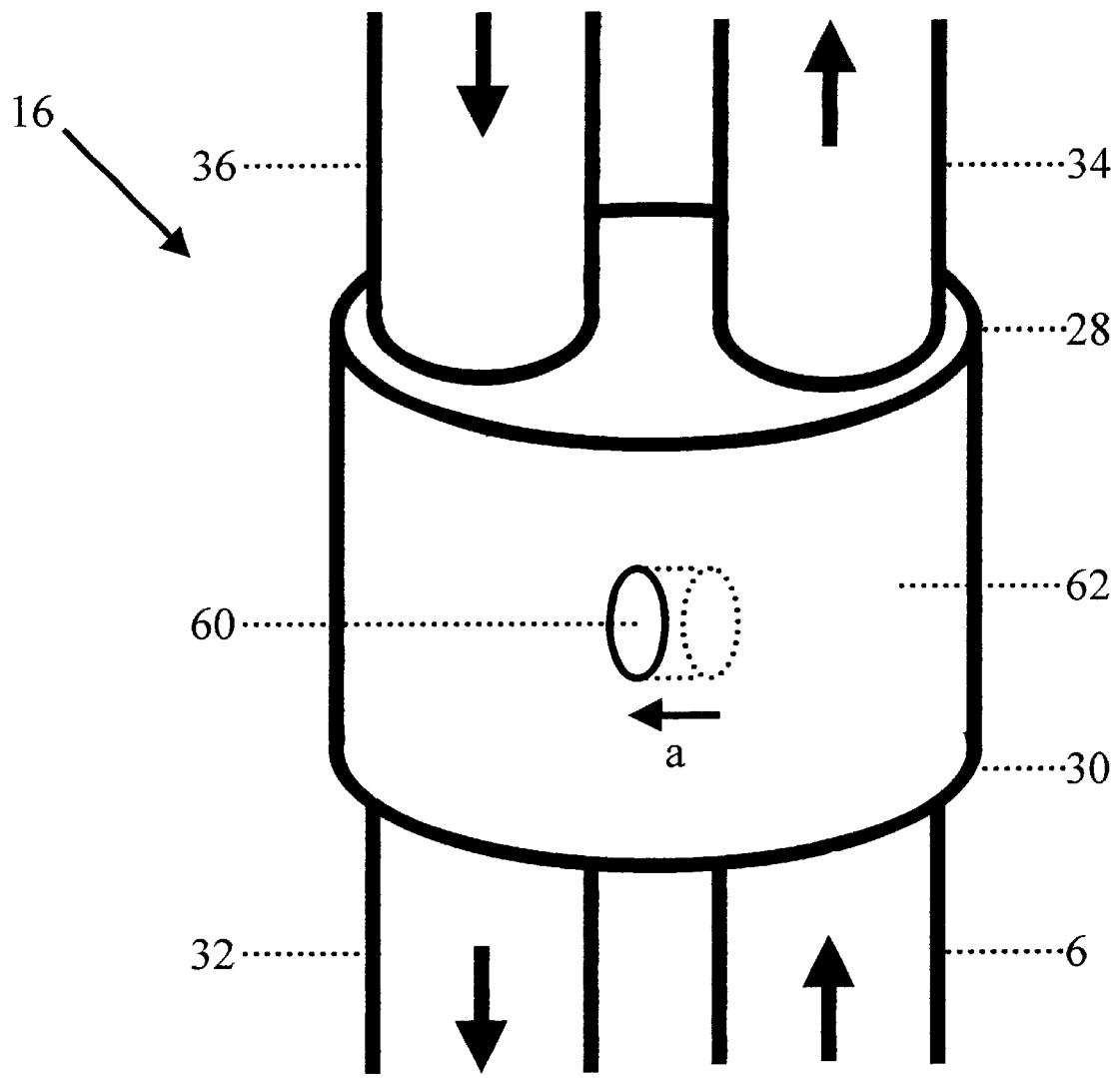
FIG. 8 shows a perspective view of another preferred embodiment of the pressurizer described herein.
Figure 9:
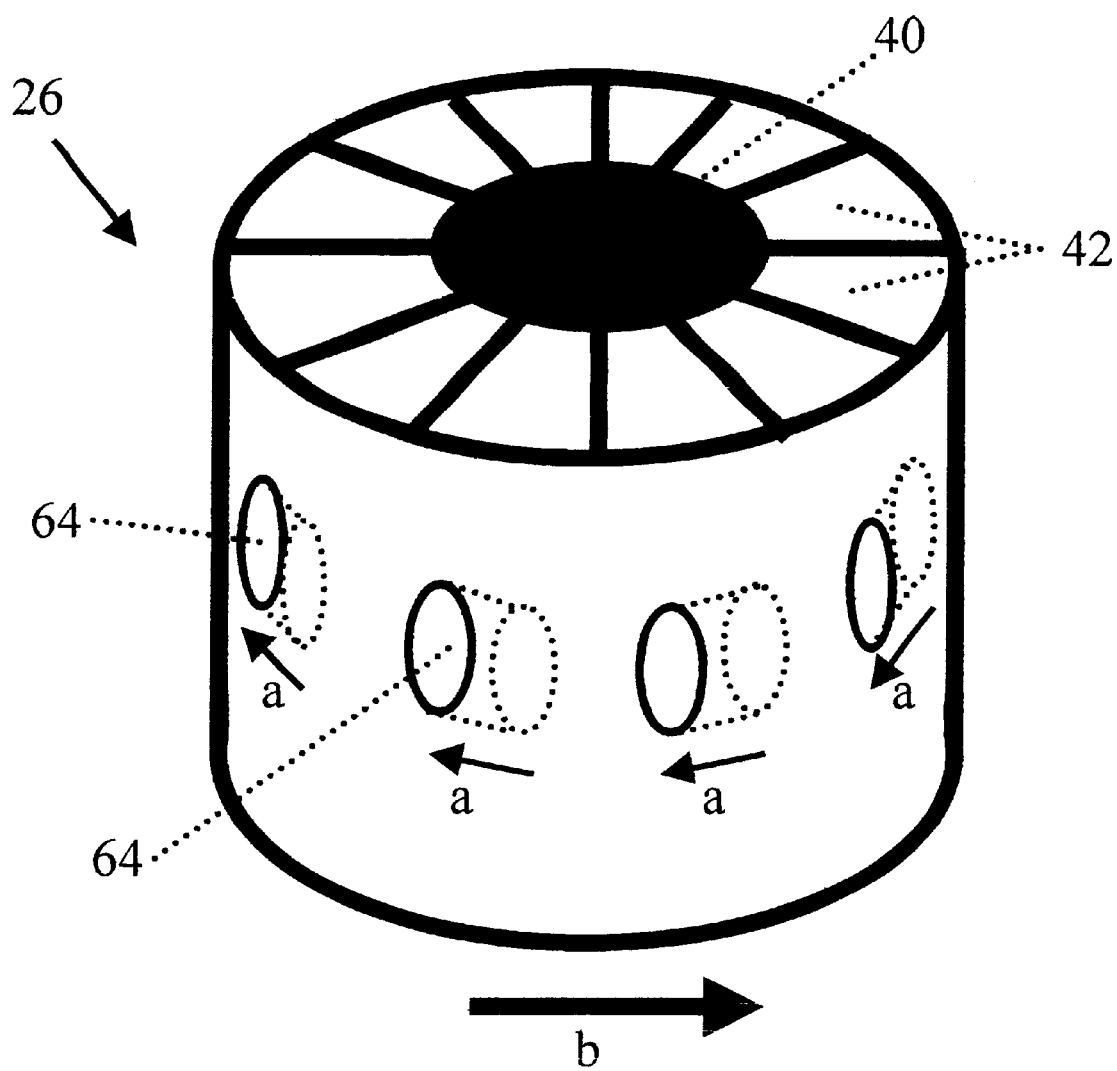
FIG. 9 shows a perspective view of a spindle associated with the pressurizer in FIG. 8.

Referring now to FIG. 8, in another preferred embodiment of the present invention, pressurizer 16 has a spindle housing 62 with a housing jet hole 60. In this embodiment, the spindle 26 as shown in FIG. 9 is placed inside the spindle housing 62. The housing jet hole 60 is a hole that penetrates the wall of the spindle housing 60 in a direction that is not perpendicular to the wall. Rather, the housing jet hole 60 is pointed in a direction shown by arrow "a" that is opposite the direction of rotation "b" of the spindle 26. Of course, these directions could be reversed. Further, spindle 26 contains spindle jet holes 64 corresponding to transfer chambers 42 (i.e. one spindle jet hole 64 per transfer chamber 42) that are cut similarly to housing jet hole 60 in that they are not perpendicular to the wall of spindle 26. Rather, they point in a direction shown by the arrow "a." There is further a seal (not shown) between the outer wall of the spindle 26 and the inner wall of the spindle housing 62 so that fluid inside a transfer chamber 42 can only escape via its corresponding spindle jet hole 64 when its spindle jet hole 64 is aligned with the housing jet hole 60.

Housing jet hole 60 should be located in the wall of the spindle housing 62 "after" the pressurant conduit 36/engine conduit 32 pair in the direction of rotation of the spindle 26. The function of the holes will now be explained. After a transfer chamber 42 has just completed the part of the cycle in which it is in pressure communication with the pressurant conduit 36, the transfer chamber now contains some, if any, propellant 12, and is mostly or completely full will pressurant 20. The housing jet hole 60 is located after this part of the cycle. As the transfer chamber 42 continues in its cycle, its then comes to the housing jet hole 60, so that its corresponding spindle jet hole 64 and housing jet hole 60 line up (or approximately line up). At this point, the high-pressure pressurant flows out of the jet holes 60, 64 in the direction shown by the arrow "a." This flow of gas results in an impulse reaction acting on the spindle 26, thus pushing it in the direction shown by the arrow "b." The size and diameter of the jet holes 60, 64 has been exaggerated in the drawings, but it would be obvious to one skilled in the art how to adjust the size, shape, dimensions, direction, and location of the holes in order to effect the spinning of spindle 26 by the exhausting of jets of pressurant 20 through the holes. In this embodiment, an external driving means, such as a motor 58, is replaced or supplemented by the impulse reaction provided by the expulsion of pressurant 20 through the jet holes 60, 64.

Figure 10:
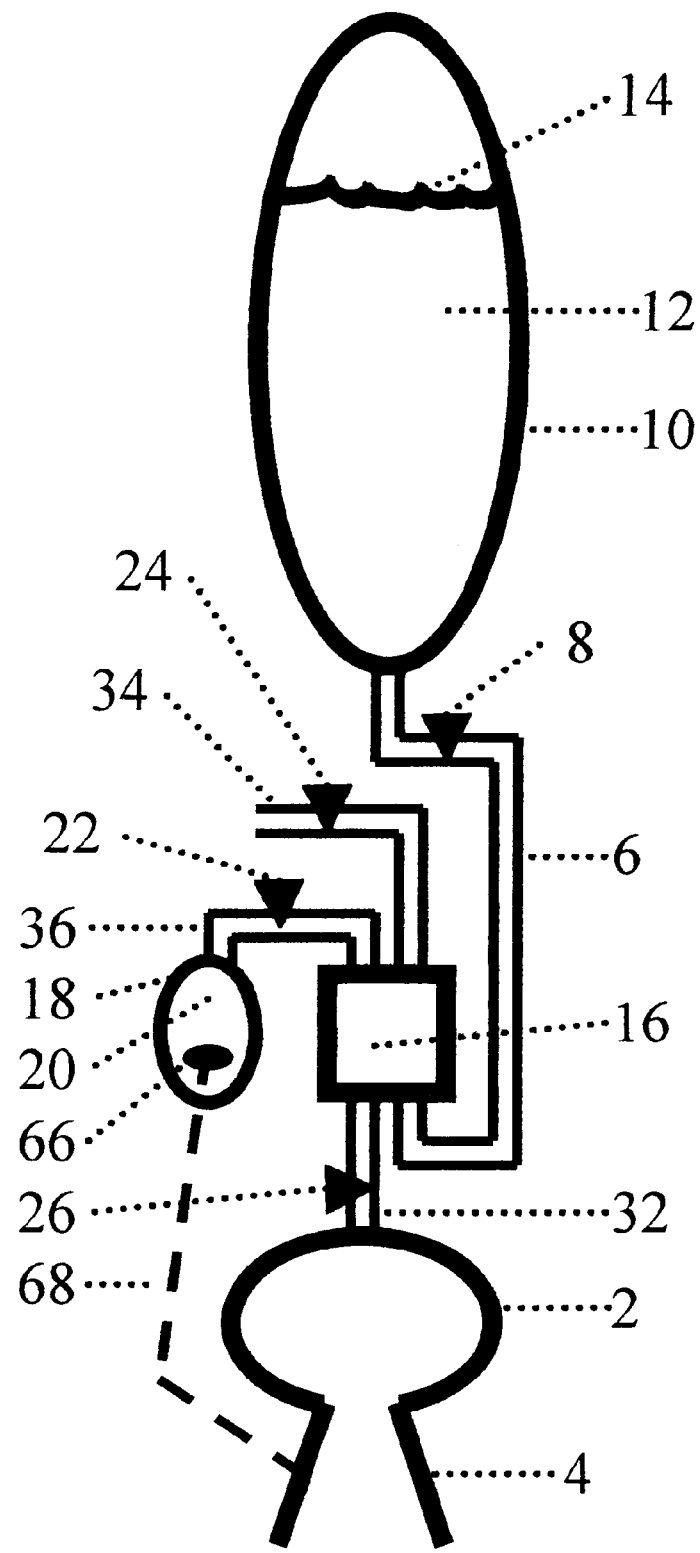
FIG. 10 shows a schematic view of a rocket engine system with a heater for the pressurant.

Referring now to FIG. 10, in another preferred embodiment, pressurant tank 18 contains a heating element 66 to heat the pressurant 20. If pressurant 20 is a liquid with a high vapor pressure, then as the vapor expands (corresponding with the pressurizing of the transfer chambers 42 according to the cycle previously explained), the liquid evaporates to replenish the vapor, causing the temperature of the liquid to drop, resulting in a corresponding drop in the vapor pressure. In order to assure a constant vapor pressure of the pressurant 20, heating element 66 applies heat to pressurant 20, keeping it at a constant temperature. The heating element 66 can be an electric resistance element or combustor in which a small quantity of propellant 12 combusts/decomposes. Further, a heat conductive lead 68 could connect the heating element 66 with the engine 2 or the nozzle 4, thus conducting some of the heat of combustion in the rocket engine 2 to the pressurant 20. Further, heat conductive lead 68 could consist of conduit, thus directing a small stream of combustion gases directly from the engine 2 to the heating element 66, and then back to the engine 2. One skilled in the art would realize the many ways possible to provide heat to pressurant 20 to keep it at a constant temperature and vapor pressure.

Figure 11:
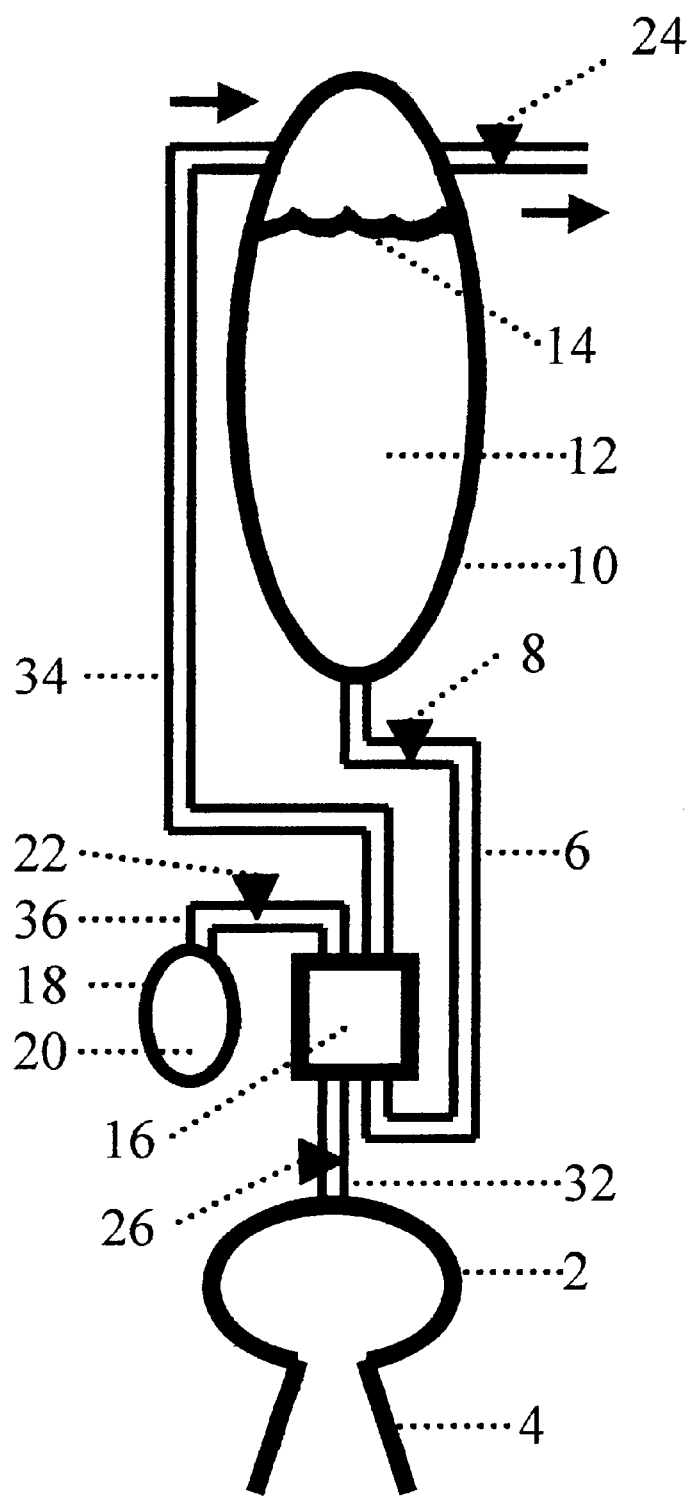
FIG. 11 shows a schematic view of a rocket engine system with the propellant tank pressurized by the pressurant exhaust.

Referring now to FIG. 11, in another preferred embodiment, exhaust conduit 34 consists of two parts, only one of which is shown in FIG. 11. The first part, shown in FIG. 11, is connected directly to propellant tank 10 in order to provide pressure to propellant tank 10. Propellant tank 10 should be pressurized by gas, as discussed previously, if the pressure head provided by the weight of the propellant (by way of the height of meniscus 14 relative to the pressurizer 16) is insufficient to cause sufficient propellant flow. Propellant tank 10 can be pressurized by the unused pressurant 20 remaining in the transfer chambers 42 just before it is exhausted. So the first part of exhaust conduit 34 directs the flow of the unused pressurant 20 to propellant tank 10, thus pressurizing the propellant 12. The second part of the exhaust conduit 34 (not shown in FIG. 11) is similar to the exhaust conduit 34 shown in FIG. 10, in that it is not connected to the propellant tank 10. In the cycle of a transfer chamber 42, the transfer chamber 42 first comes upon the first part of the exhaust conduit 34, thus pressurizing the propellant tank 10. Next, the transfer chamber 42 moves past and ends pressure communication with the first part of the exhaust conduit 34, and comes upon the second part of the exhaust conduit 34, where propellant 12 can displace the remaining pressurant 20 in the transfer chamber 42 as the remaining pressurant 20 is exhausted via the second part of exhaust conduit 34. As would be obvious to one skilled in the art, there are many ways to modify the rocket engine system described herein to make use of the unused pressurant 20 to pressurize the propellant tank 10. Further, FIG. 11 shows an exhaust valve 24 that regulates the pressure in propellant tank 10. Because the pressure of pressurant 20 is so high in relation to the needed pressure in propellant tank 10, it may be necessary to evenly vent propellant tank 10 via exhaust valve 24 in order to keep the pressure in propellant tank 10 constant.

Figure 12:
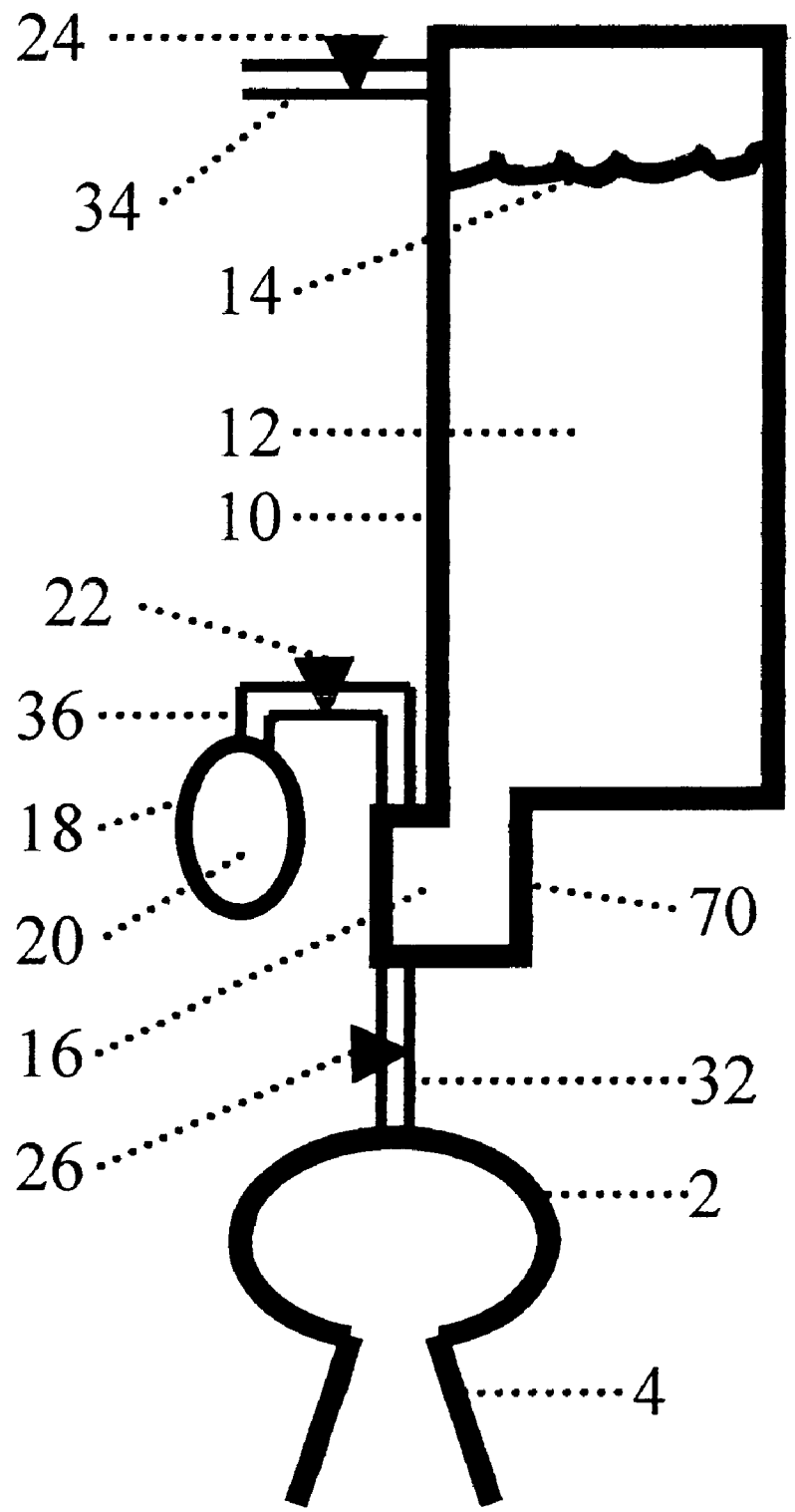
FIG. 12 shows a schematic view of a rocket engine system employing another embodiment of the pressurizer described herein.
Figure 13:
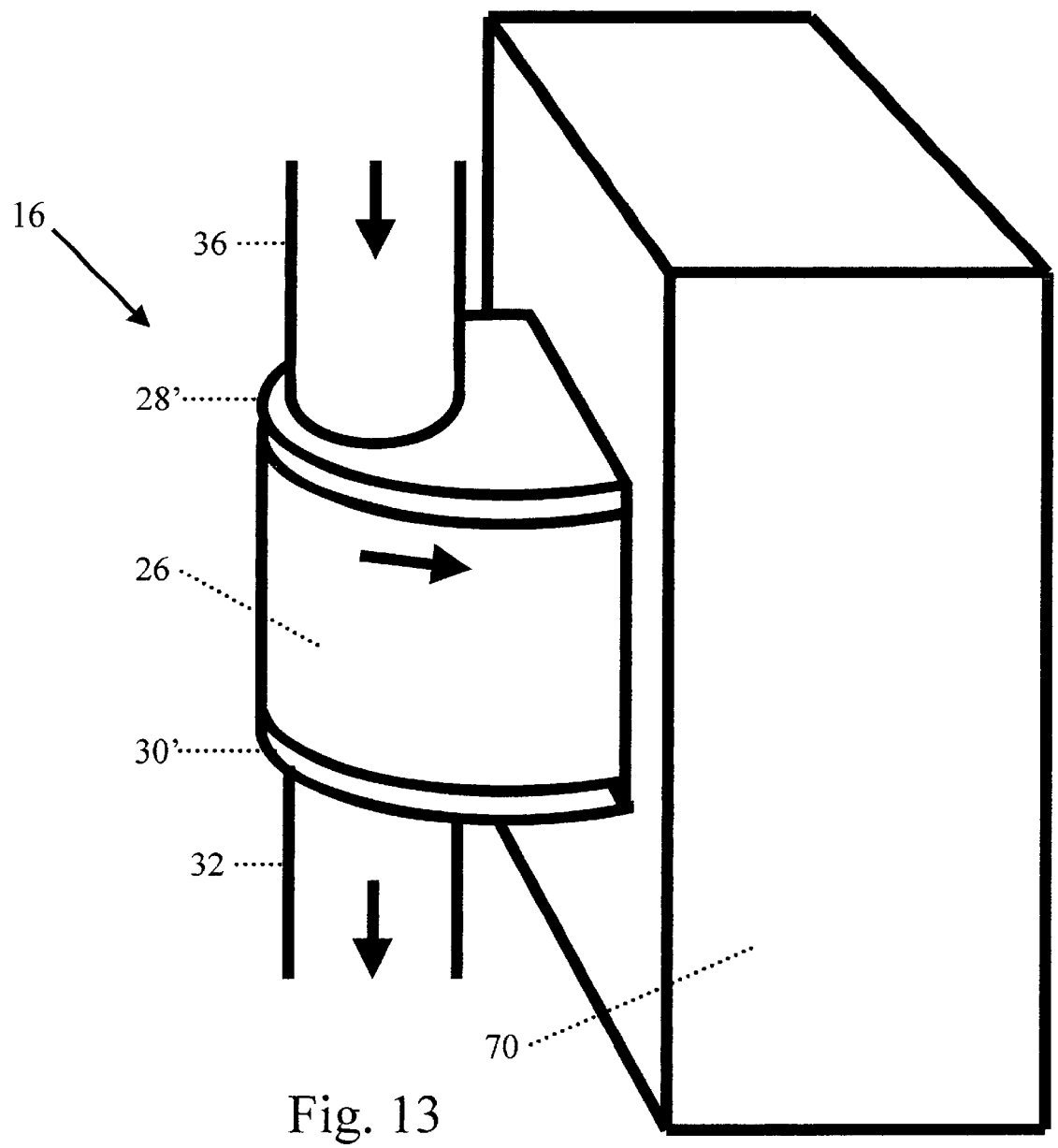
FIG. 13 shows a perspective view of the pressurizer shown in FIG. 12.
Figure 14:
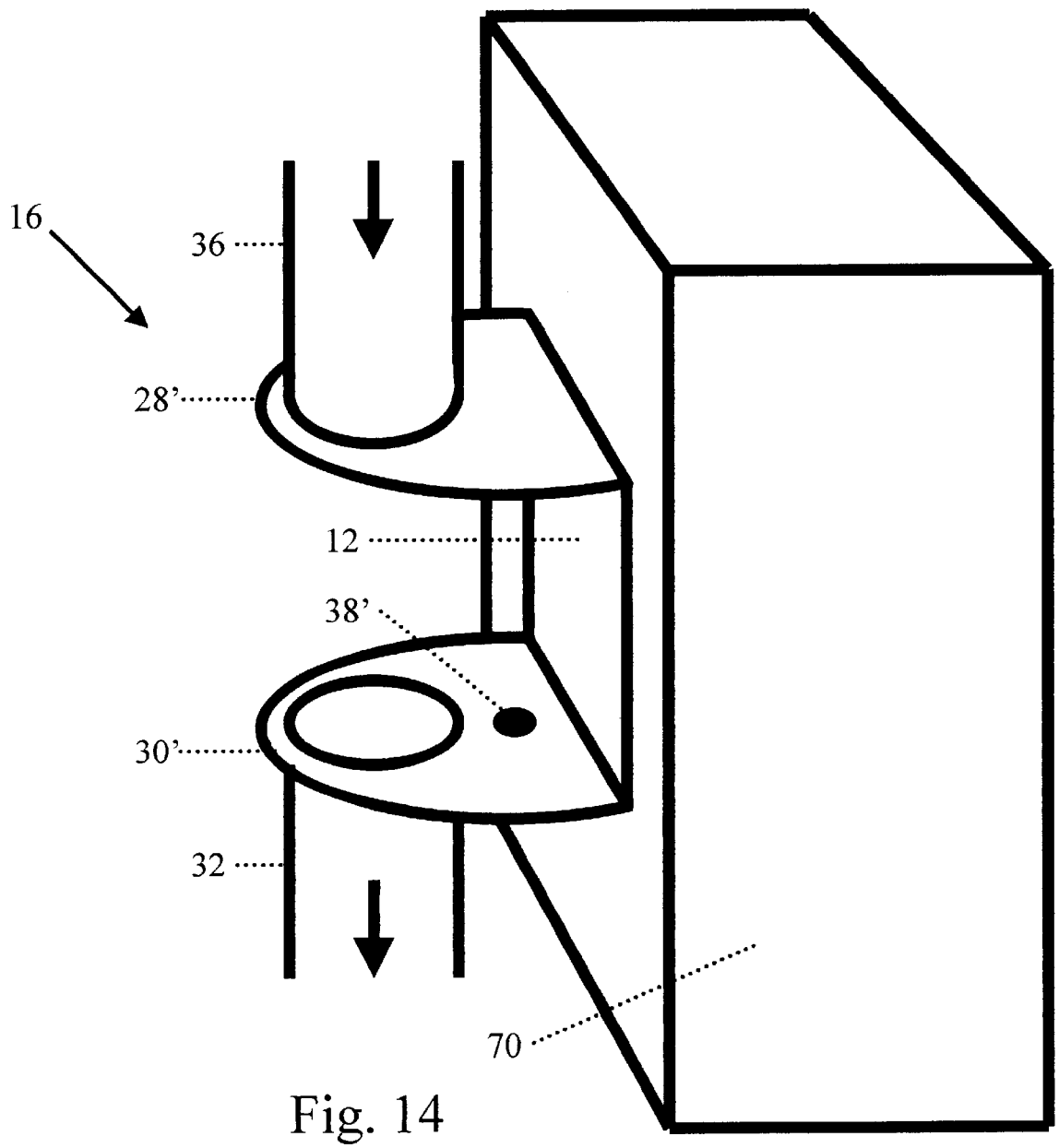
FIG. 14 shows a perspective view of the pressurizer in FIG. 13 without the spindle.

Referring now to FIG. 12, in another preferred embodiment of the present invention, the pressurizer 16 is built into the propellant tank bottom portion 70 of the propellant tank 10 as shown. FIG. 13 shows a close-up of the pressurizer portion of the rocket engine system shown in FIG. 12. A top chamber separator 28', which is approximately half the size of the top chamber separator 28 shown in FIG. 2 and is connected on one side to pressurant conduit 36, is connected on the other side to the propellant tank bottom portion 70. A bottom chamber separator 30', which is approximately half the size of the bottom chamber separator 30 shown in FIG. 2 and is connected on one side to engine conduit 32, is connected on the other side to the propellant tank bottom portion 70 (as shown in FIG. 13). The propellant conduit 6 and exhaust conduit 34 have been replaced in this embodiment by the propellant tank bottom portion 70. Besides these modifications, other aspects of this embodiment (e.g. the use of a seal, the use of a spindle 26, etc.) are similar to that described previously. Referring now to FIG. 14, a rotatable connector 38' is located on the bottom chamber separator 30', and a similar connector could be located on the top chamber separator 28'.

Now a portion of the cycle of a spindle 26 will be described. The portion of the cycle involving pressurant conduit 36 and engine conduit 32 is similar to that described previously with regard to FIGS. 6a and 6b, and will not be repeated. After a transfer chamber 42 has moved past conduits 32, 36, it then comes upon the entrance to propellant tank bottom portion 70. At this point, both the top and bottom of the transfer chamber 42 are open to and in pressure communication with—the propellant tank 10 and the propellant 12 that it contains. The high-pressure unused pressurant 20 remaining in the transfer chamber 42 then expands against the propellant 12 located in the propellant tank bottom portion 70, resulting in a bubble that rises due to a bouyant force of the propellant 12 acting on the pressurant 20. As the bubble of pressurant 20 rises, it is displaced in the transfer chamber 42 by propellant 12, until the transfer chamber 42 is completely filled with propellant 12 and no pressurant 20 remains. The bubble of pressurant 20 continues rising until it breaks meniscus 14. Pressurant 20, because of its high pressure, serves to pressurize propellant tank 10, and exhaust valve 24 is used to regulate the pressure inside propellant tank 10, as previously discussed. As the transfer chamber continues in its cycle, it then comes upon the exit of propellant tank bottom portion 70, where its pressure communication with propellant tank 10 ends. Then, the cycle ends, and a new cycle begins, the beginning of which has been described before in regard to FIGS. 6a and 6b.

In another embodiment, not shown, the spindle 26 is rotated by an external rotation means, such as a motor, engine, or turbine, as discussed. Further, in another embodiment, the embodiment shown in FIGS. 13 and 14 is modified with jet holes 60, 64 shown in FIGS. 8 and 9 in order to rotate spindle 26 by means of impulse reaction. Further, in order to address the issue of flow rate discussed previously, the cross section of the engine conduit 32 may be smaller than shown in the drawings, and/or the chamber separators 28', 30' may be smaller so that each transfer chamber spends a greater portion of its cycle inside propellant tank bottom portion 70. Similar modifications to achieve similar ends would be obvious to one skilled in the art.

Figure 15:
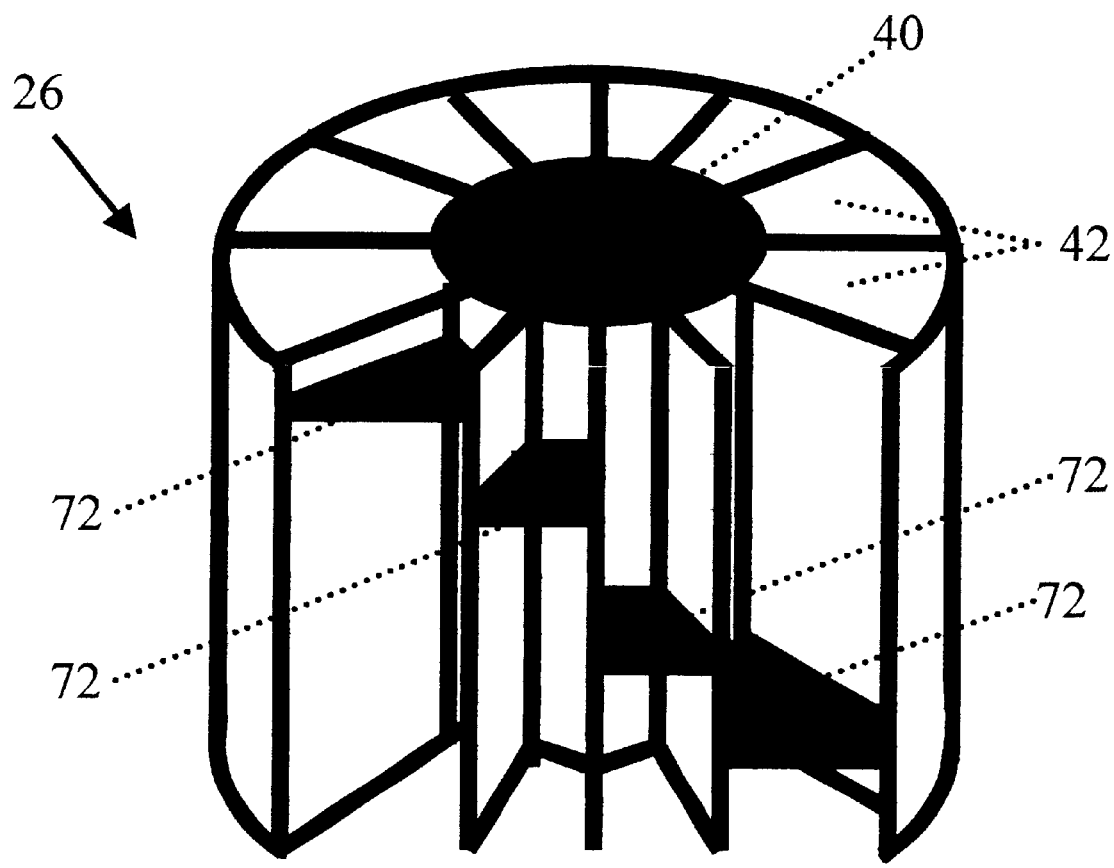
FIG. 15 is a cut-away view of a spindle with a movable piston in each transfer chamber.

Referring now to FIG. 15, each transfer chamber 42 contains a movable means for separating the pressurant 20 from the propellant 12, such as a piston 72. Piston 72 can move up and down inside the transfer chamber 42 while maintaining a seal with the inside walls of the transfer chamber 42, to prevent the leak of propellant 12 into the region above the piston 72 or the leak of pressurant 20 into the region below the piston 72. The cycle proceeds as previously described with regard to FIGS. 6a and 6b, the only difference being that the pressurant 20 acts indirectly on propellant 12 via piston 72. Piston 72 could have the added feature that it cannot move any higher than the top of the transfer chamber 42 or any lower the than the bottom of the transfer chamber 42. This has the benefit that there would be no worry about "overfilling" each transfer chamber 42 with propellant 12, and no propellant 12 would be directly lost through exhaust conduit 34. It further has the benefit that there would be no worry about feeding pressurant 20 directly to the engine 2 via engine conduit 32. Any pressurant 20 that made it to the engine 2 could interrupt combustion and possibly fail the engine.

Figure 16:
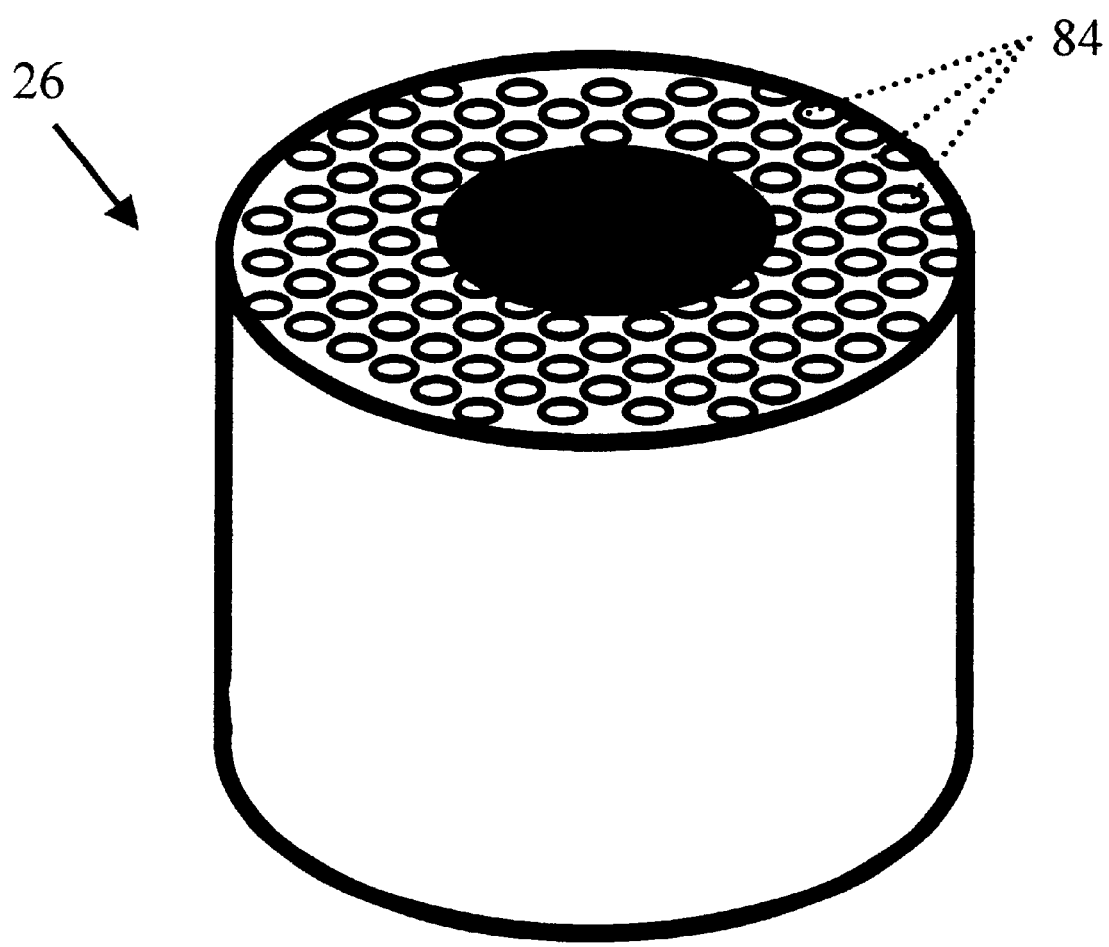
FIG. 16 is a perspective view of a spindle with very thin transfer chambers.

Referring now to FIG. 16, in another preferred embodiment,-spindle 26 contains a plurality of very thin transfer chambers 84. It is the same as the spindle 26 described previously, except for the existence of thin transfer chambers 84. The thinner the thin transfer chambers 84, the fewer the instabilities—e.g. splashing of propellant 12, bubbles of pressurant 20 in propellant 12, unevenness of the meniscus of propellant 12, etc. One might conceive of a thin transfer chamber 84 so thin that propellant 12 is fed into it by means of a capillary effect. This is all within the scope of the present invention.

Figure 17:
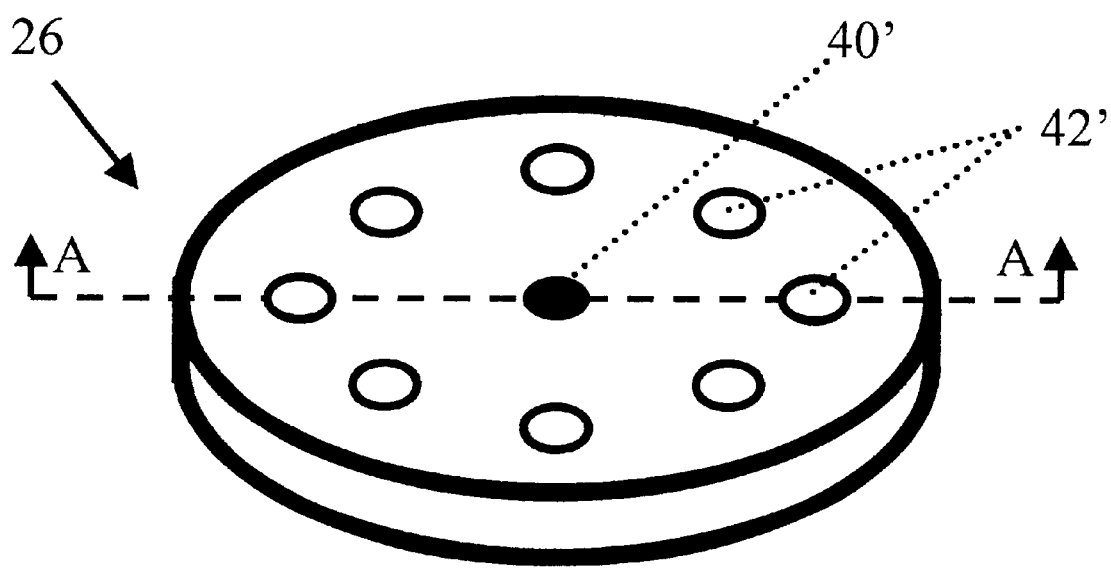
FIG. 17 is a perspective view of a spindle with a flexible membrane in each transfer chamber.
Figure 18:
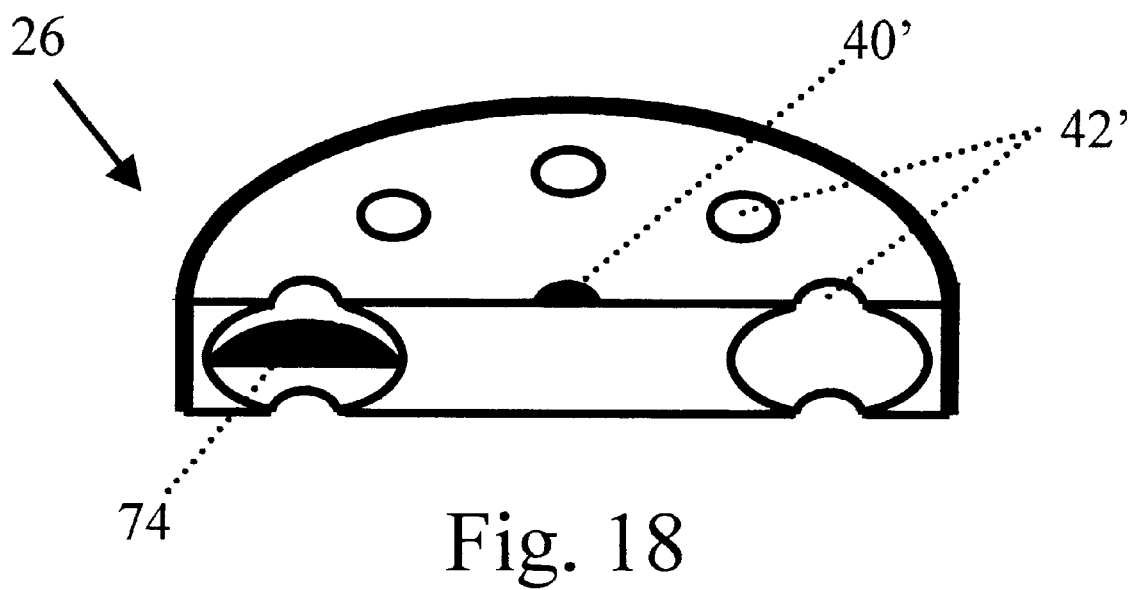
FIG. 18 is a cut-away view along cross section A—A shown in FIG. 17.

Referring now to FIGS. 17 and 18, in another preferred embodiment, spindle 26 houses several transfer chambers 42', each of which contains a movable membrane 74 that is capable of separating a region above it from a region below it. The membrane 74 serves a similar purpose as piston 72 shown in FIG. 15, except that the edges of membrane 74 are permanently attached to the walls of transfer chamber 42', so that there is no need to provide a moving seal between the membrane 74 and the walls of transfer chamber 42'. Rather, while the edges of membrane 74 stay fixed in relation to the transfer chamber 42', the remainder of the membrane 74 (particularly near the center) moves up and down in the transfer chamber 42' in response to the filling and draining of propellant 12 per the cycle previously described. This embodiment, like the embodiment involving piston 72, has the advantage that membrane 74 would prevent the direct feeding of propellant 12 to exhaust conduit 34 and the direct feeding of pressurant 20 to engine conduit 32.

It will be apparent to one skilled in the art that the transfer chamber 42 need not be housed in a spindle 26, need not rotate with the spindle 26, and need not be in a cycle of rotation at all—it could move in many other cyclical ways relative to the conduits 6, 32, 34, 36 and chamber separators 28, 30. By way of example and not of limitation, a transfer chamber could reciprocate between the pressurant conduit 36/engine conduit 32 pair and the exhaust conduit 34/propellant conduit 6 pair. In order to provide constant, uninterrupted flow to the engine 2 via engine conduit 32, several such reciprocating transfer chambers 42 could be used in parallel, each one corresponding to a different stage in the cycle. In all cases, however, at least one transfer chamber 42 moves in a cycle to transfer a propellant/fluid from a filling stage to a pressurizing/emptying stage.

I claim:
1. A pressurizer for pressurizing a liquid fluid, comprising:
 a pressurant entrance for the introduction of a pressurant;

a liquid fluid entrance for said liquid fluid;

a liquid fluid exit for said liquid fluid; and a transfer chamber movable in a revolving cycle with respect to at least one of said pressurant entrance, said liquid fluid entrance, and said liquid fluid exit, wherein for a portion of a cycle said pressurant exerts a force on said liquid fluid inside said transfer chamber through a movable partition.

2. The pressurizer as claimed in claim 1, further comprising a spindle housing more than one transfer chamber.

3. The pressurizer as claimed in claim 2, wherein the spindle is rotatable.

4. The pressurizer as claimed in claim 3, wherein the spindle is rotatable about an axis between said liquid fluid entrance and said liquid fluid exit.

5. The pressurizer as claimed in claim 1, wherein said movable membrane comprises a flexible membrane to separate said pressurant and said liquid fluid.

6. The pressurizer as claimed in claim 1, wherein said movable partition comprises a movable piston to separate said pressurant and said liquid fluid.

7. The pressurizer as claimed in claim 1, further comprising a pressurant exit for a pressurant exhaust.

8. The pressurizer as claimed in claim 7, wherein said pressurant exhaust is exhausted in a direction substantially opposite a direction of motion of said transfer chamber.

9. The pressurizer as claimed in claim 1, further comprising a motor to move said transfer chamber.

10. The pressurizer as claimed in claim 1, wherein a cross section of said pressurant entrance is larger than a cross section of said liquid fluid exit.

11. The pressurizer as claimed in claim 7, wherein a cross section of said pressurant exit is larger than a cross section of said liquid fluid entrance.

12. A rocket engine system, comprising:

a pressurant;

a pressurant container;

a liquid propellant;

a propellant container;

a rocket engine; and a transfer chamber movable in a revolving cycle with respect to at least one of said pressurant container said propellant container, and said rocket engine, wherein for a portion of a cycle said pressurant exerts a force on said liquid propellant inside said transfer chamber through a movable partition.

13. The rocket engine system as claimed in claim 12, wherein for a portion of a cycle a bouyant force causes said liquid propellant to flow into, and said pressurant to flow out of, said transfer chamber.

14. The rocket engine system as claimed in claim 12, further comprising a heating means for heating said pressurant.

15. The rocket engine system as claimed in claim 14, wherein said heating means comprises a heat conductor for conducting heat from said rocket engine to said pressurant.

16. The rocket engine system as claimed in claim 12, wherein a pressurant exhaust exerts a force on said liquid propellant inside said propellant container.

17. The rocket engine system as claimed in claim 12, wherein said liquid propellant comprises an oxidizer and a fuel.

18. The pressurizer as claimed in claim 1, wherein a cross section of said liquid fluid entrance is greater than a cross section of said liquid fluid exit.

19. The rocket engine system as claimed in claim 12, further comprising an engine conduit between said transfer chamber and said engine and a propellant conduit between said transfer chamber and said liquid container, wherein a cross section of said liquid propellant conduit is greater than a cross section of said engine conduit.

20. A fluid transport system for transferring liquid fluid from a low pressure reservoir to an outlet at high pressure in a continuous stream, comprising:

a plurality of storage tanks, each of said storage tanks being capable of confining liquid fluid at high pressure;

draining means comprising a movable partition for draining liquid fluid from each of said plurality of storage tanks in sequential order to said outlet, said draining means draining each of said plurality of tanks in sequence such that a continuous stream of liquid fluid is supplied to said outlet at high pressure; and filling means for supplying liquid fluid from said low pressure reservoir to each of said drained storage tanks in revolving sequential order to fill said respective tanks with said liquid fluid;

said sequential order of each of said draining means and said filling means being out of phase with each other such that as one storage tank in said plurality is being drained by said draining means, at least another of said storage tanks is being filled by said filling means, wherein at least one of said storage tanks is movable in a cycle with respect to at least one of said draining means and said filling means.

21. The fluid transport system defined in claim 20, further comprising:

venting means for venting each of said storage tanks in sequential order for releasing pressure in said storage tanks subsequent to draining thereof by said draining means and prior to filling thereof by said filling means;

said sequential order of each of said draining means, said filling means and said venting means being out of phase with each other, wherein while one tank in said plurality is being drained, another of said storage tanks is vented, and at least still another one of said storage tanks is being filled.

22. A method for transferring liquid fluid from a low pressure reservoir to an outlet at high pressure in a continuous stream, the method comprising the steps of:

confining liquid fluid at high pressure on a side of a movable partition in each of a plurality of storage tanks;

moving each of the plurality of storage tanks in a revolving cycle with respect to said outlet;

draining by moving said partition liquid fluid from each of the plurality of storage tanks in sequential order to thereby supply a continuous stream of liquid fluid at high pressure to the outlet; and supplying liquid fluid from the low pressure reservoir to each of the drained storage tanks in sequential order to fill the respective tanks with the liquid fluid;

wherein the sequential order in which the storage tanks are drained is out of phase with the sequential order in which the storage tanks are filled such that as one storage tank is being drained, at least another of the storage tanks is being filled.

23. The method according to claim 22, further comprising a step of venting each of the storage tanks in sequential order following said draining step and prior to said supplying step to release pressure in the storage tanks.

24. The pressurizer as claimed in claim 1, wherein said transfer chamber is movable in a cycle with respect to said pressurant entrance, said liquid fluid entrance, and said liquid fluid exit, and wherein said pressurizer is configured so that for a portion of a cycle, but not for a whole of said cycle, said pressurant entrance and said liquid fluid exit are in pressure communication via said transfer chamber and said pressurant exerts a force on said liquid fluid inside said transfer chamber.

25. The pressurizer as claimed in claim 1, wherein said pressurizer is configured to transfer said liquid fluid from a low pressure reservoir to an outlet at high pressure in a continuous stream.

26. The pressurizer as claimed in claim 1, wherein said pressurizer is configured to provide a continuous steam of said liquid fluid from said liquid fluid exit throughout a cycle.

27. The rocket engine system as claimed in claim 12, wherein said transfer chamber is movable in a cycle with respect to said pressurant container, said propellant container, and said rocket engine, and wherein said system is configured so that for a portion of a cycle, but not for a whole of said cycle, said pressurant container and said rocket engine are in pressure communication via said transfer chamber and said pressurant exerts a force on said liquid propellant inside said transfer chamber.

28. The pressurizer as claimed in claim 12, wherein a pressurant pressure inside said pressurant container is higher than a liquid propellant pressure inside said propellant container, and said system is configured to transfer said liquid propellant from said propellant container to said rocket engine in a continuous stream.

29. The pressurizer as claimed in claim 12, wherein said system is configured to provide a continuous stream of said liquid propellant to said rocket engine throughout a cycle.

* * * * *